United States Patent
Zeng et al.

(10) Patent No.: US 6,522,783 B1
(45) Date of Patent: Feb. 18, 2003

(54) RE-INDEXING FOR EFFICIENT COMPRESSION OF PALETTIZED IMAGES

(75) Inventors: Wenjun Zeng, Vancouver, WA (US); Shaw-Min Lei, Camas, WA (US); Jin Li, Beijing (CN)

(73) Assignee: Sharp Laboratories Of America, Inc., Camas, WA (US)

( * ) Notice: Subject to any disclaimer, the term of this patent is extended or adjusted under 35 U.S.C. 154(b) by 0 days.

(21) Appl. No.: 09/448,061

(22) Filed: Nov. 23, 1999

(51) Int. Cl.[7] .................................................. G06K 9/36
(52) U.S. Cl. ....................... 382/239; 382/243; 382/166; 341/107
(58) Field of Search ............................. 382/232–24.9, 382/162–167; 348/409.1–421; 345/600–611; 341/107

(56) References Cited

U.S. PATENT DOCUMENTS

| | | | | |
|---|---|---|---|---|
| 5,297,220 A | * | 3/1994 | Normizu | 382/247 |
| 5,471,207 A | | 11/1995 | Zandi et al. | 341/107 |
| 5,659,631 A | | 8/1997 | Gormish et al. | 382/166 |
| 5,689,589 A | | 11/1997 | Gormish et al. | 382/239 |
| 5,990,864 A | * | 11/1999 | DeAguiar et al. | 345/600 |
| 6,038,346 A | * | 3/2000 | Ratnakar | 382/239 |
| 6,285,790 B1 | * | 9/2001 | Schwartz | 382/234 |

OTHER PUBLICATIONS

M. J. Gormish, "Compression of palettized images by color," *IEEE Inter. Conf. Image Proc.*, 1995, pp. 1–4.
JBIG, "Coded representation of picture and audio information—progressive bi–level image compression standard," ISO/IEC 11544:1993(E), pp. 1–3.
M. J. Weinberger, G. Seroussi and G. Sapiro, "LOCO–I: A low complexity, context–based, lossless image compression algorithm," *Proc. IEEE Data Compression Conference*, Mar. 1996, pp. 1–11.
S. W. Golomb, "Run–length encodings," *IEEE Trans. Inform. Theory*, vol. IT–12, Jul. 1966, pp. 399–401.
R. F. Rice, "Some practical universal noiseless coding techniques," *Tech. Rep. JPL–79–22*, Jet propulsion Laboratory, Pasadena, CA Mar. 1979, pp. 1–3.
D. Taubman, "Report on core experiment CodEff22: (EBCOT: Embedded Block Coding with Optimized Truncation)," ISO/IEC JTC1/SC29/WG1 N1020R, Oct. 21, 1998, pp. 1–80.
N. Merhav, G. Seroussi, and M. J. Weinberger, "Modeling and low–complexity adaptive coding for image prediction residuals," *Proc. IEEE Inter. Conf. Image Proc.*, 1996, pp. 353–356.

* cited by examiner

*Primary Examiner*—Jingge Wu
(74) *Attorney, Agent, or Firm*—Marger Johnson & McCollom, P.C.

(57) ABSTRACT

A method for re-indexing a palette-indexed image is disclosed. The method uses an array of symbol cross-counts that indicate the degree of occurrence, within the image, of symbols in one or more predefined contextual relationships, such as symbol adjacency. One objective of the method is to manipulate the palette index such that adjacent symbols in the image are assigned indices that are as close as possible in symbol space, thus enhancing the subsequent compressability of the image with many lossless compressors. As global minimization is generally computationally impracticable, the disclosed embodiments present a greedy suboptimal solution to this problem.

The basic method uses a one-dimensional reassignment pool and a seed symbol. A single symbol is selected for positioning either to the immediate right or left of the seed in the pool, according to a potential function that uses the cross-count array. This process is then iterated, considering the first and second pool symbols during the next selection, etc., placing symbols in the pool so as to minimize the average interpixel differences in the re-indexed image.

23 Claims, 8 Drawing Sheets

Fig. 6

| 0 | 1 | 2 | 2 | 3 | 3 | 3 | 4 | 4 | 4 | 5 | 5 | 5 | 5 | 5 | 5 |
|---|---|---|---|---|---|---|---|---|---|---|---|---|---|---|---|
| 1 | 2 | 2 | 2 | 2 | 3 | 3 | 3 | 4 | 4 | 5 | 5 | 6 | 6 | 6 | 6 |
| 5 | 5 | 2 | 2 | 2 | 3 | 3 | 3 | 4 | 4 | 5 | 5 | 6 | 7 | 7 | 7 |
| 3 | 5 | 5 | 2 | 2 | 2 | 3 | 3 | 4 | 4 | 5 | 5 | 6 | 6 | 6 | 6 |
| 3 | 3 | 5 | 5 | 2 | 2 | 3 | 3 | 4 | 4 | 5 | 5 | 6 | 7 | 7 | 7 |
| 5 | 3 | 3 | 5 | 5 | 2 | 2 | 3 | 4 | 4 | 5 | 5 | 6 | 6 | 6 | 6 |
| 5 | 5 | 5 | 3 | 5 | 5 | 2 | 2 | 1 | 1 | 1 | 1 | 6 | 7 | 7 | 7 |
| 5 | 5 | 5 | 5 | 3 | 5 | 5 | 1 | 6 | 6 | 6 | 6 | 6 | 6 | 6 | 6 |
| 5 | 5 | 5 | 5 | 5 | 3 | 1 | 6 | 8 | 8 | 0 | 9 | 6 | 1 | 6 | 6 |
| 5 | 5 | 5 | 5 | 5 | 5 | 1 | 6 | 8 | 10 | 0 | 9 | 6 | 1 | 6 | 6 |
| 1 | 5 | 1 | 5 | 1 | 5 | 1 | 6 | 10 | 10 | 10 | 0 | 6 | 1 | 5 | 5 |
| 5 | 1 | 5 | 1 | 5 | 1 | 1 | 6 | 11 | 10 | 9 | 0 | 6 | 1 | 5 | 5 |
| 1 | 5 | 1 | 5 | 1 | 7 | 5 | 1 | 6 | 6 | 6 | 6 | 1 | 5 | 5 | 5 |
| 5 | 1 | 5 | 1 | 7 | 5 | 7 | 5 | 1 | 1 | 1 | 1 | 3 | 5 | 5 | 5 |
| 1 | 5 | 1 | 7 | 5 | 7 | 5 | 5 | 5 | 5 | 4 | 5 | 3 | 3 | 5 | 5 |
| 1 | 1 | 1 | 1 | 1 | 1 | 1 | 6 | 5 | 4 | 4 | 2 | 5 | 3 | 3 | 5 |
| 7 | 7 | 7 | 7 | 7 | 7 | 7 | 6 | 5 | 5 | 4 | 2 | 5 | 3 | 3 | 3 |

| | 0 | 1 | 2 | 3 | 4 | 5 | 6 | 7 | 8 | 9 | 10 | 11 |
|---|---|---|---|---|---|---|---|---|---|---|---|---|
| 0 | | 1 | | | | 2 | | 1 | 3 | 2 | | |
| 1 | | | 3 | 2 | | 27 | 15 | 3 | | | | |
| 2 | | | | 6 | 2 | 7 | | | | | | |
| 3 | | | | | 6 | 15 | | | | | | |
| 4 | | | | | | 10 | | | | | | |
| 5 | | | | | | | 7 | 7 | | | | |
| 6 | | | | | | | | 4 | 2 | 2 | 1 | 1 |
| 7 | | | | | | | | | | | | |
| 8 | | | | | | | | | | | 1 | |
| 9 | | | | | | | | | | | 1 | |
| 10 | | | | | | | | | | | | 1 |
| 11 | | | | | | | | | | | | |

Fig. 8

| | 2 | 4 | 3 | 5 | 1 | 6 | 7 | 0 | 9 | 10 | 8 | 11 |
|---|---|---|---|---|---|---|---|---|---|---|---|---|
| 2 | | 2 | 6 | 7 | 3 | | | | | | | |
| 4 | | | 6 | 10 | | | | | | | | |
| 3 | | | | 15 | 2 | | | | | | | |
| 5 | | | | | 27 | 7 | 7 | | | | | |
| 1 | | | | | | 15 | 3 | 1 | | | | |
| 6 | | | | | | | 4 | 2 | 2 | 1 | 2 | 1 |
| 7 | | | | | | | | | | | | |
| 0 | | | | | | | | | 3 | 2 | 1 | |
| 9 | | | | | | | | | | 1 | | |
| 10 | | | | | | | | | | | 1 | 1 |
| 8 | | | | | | | | | | | | |
| 11 | | | | | | | | | | | | |

Fig. 9A

| Unassigned Symbols | Left Score | Pool 50 — 5 | Pool 50 — 1 | Right Score |
|---|---|---|---|---|
| 0 | 0.5 | 0 | 1 | 1.0 |
| 2 | 8.5 | 7 | 3 | 6.5 |
| 3 | 16.0 | 15 | 2 | 9.5 |
| 4 | 10.0 | 10 | 0 | 5.0 |
| 6 | 14.5 | 7 | 15 | (18.5) |
| 7 | 8.5 | 7 | 3 | 6.5 |
| 8 | 0 | 0 | 0 | 0 |
| 9 | 0 | 0 | 0 | 0 |
| 10 | 0 | 0 | 0 | 0 |
| 11 | 0 | 0 | 0 | 0 |

Fig. 9B

| Unassigned Symbols | Left Score | Pool 50 — 5 | Pool 50 — 1 | Pool 50 — 6 | Right Score |
|---|---|---|---|---|---|
| 0 | 1.2 | 0 | 1 | 2 | 2.5 |
| 2 | 8.5 | 7 | 3 | 0 | 3.8 |
| 3 | (16.0) | 15 | 2 | 0 | 7.0 |
| 4 | 10.0 | 10 | 0 | 0 | 3.3 |
| 7 | 9.8 | 7 | 3 | 4 | 7.8 |
| 8 | 0.7 | 0 | 0 | 2 | 2.0 |
| 9 | 0.7 | 0 | 0 | 2 | 2.0 |
| 10 | 0.3 | 0 | 0 | 1 | 1.0 |
| 11 | 0.3 | 0 | 0 | 1 | 1.0 |

Fig. 9C

| Unassigned Symbols | Left Score | Pool 50 — 3 | Pool 50 — 5 | Pool 50 — 1 | Pool 50 — 6 | Right Score |
|---|---|---|---|---|---|---|
| 0 | 0.8 | 0 | 0 | 1 | 2 | 2.5 |
| 2 | 10.5 | 6 | 7 | 3 | 0 | 5.3 |
| 4 | (11.0) | 6 | 10 | 0 | 0 | 4.8 |
| 7 | 5.5 | 0 | 7 | 3 | 4 | 7.8 |
| 8 | 0.5 | 0 | 0 | 0 | 2 | 2.0 |
| 9 | 0.5 | 0 | 0 | 0 | 2 | 2.0 |
| 10 | 0.2 | 0 | 0 | 0 | 1 | 1.0 |
| 11 | 0.2 | 0 | 0 | 0 | 1 | 1.0 |

Fig. 9D

| Unassigned Symbols | Left Score | Pool 50 — 4 | Pool 50 — 3 | Pool 50 — 5 | Pool 50 — 1 | Pool 50 — 6 | Right Score |
|---|---|---|---|---|---|---|---|
| 0 | 0.6 | 0 | 0 | 0 | 1 | 2 | 2.5 |
| 2 | (8.1) | 2 | 6 | 7 | 3 | 0 | 5.7 |
| 7 | 3.9 | 0 | 0 | 7 | 3 | 4 | 7.8 |
| 8 | 0.4 | 0 | 0 | 0 | 0 | 2 | 2.0 |
| 9 | 0.4 | 0 | 0 | 0 | 0 | 2 | 2.0 |
| 10 | 0.2 | 0 | 0 | 0 | 0 | 1 | 1.0 |
| 11 | 0.2 | 0 | 0 | 0 | 0 | 1 | 1.0 |

Fig. 9E

| Unassigned Symbols | Left Score | \multicolumn{6}{c}{Pool 50} | Right Score |
|---|---|---|---|---|---|---|---|---|
| | | 2 | 4 | 3 | 5 | 1 | 6 | |
| 0 | 0.5 | 0 | 0 | 0 | 0 | 1 | 2 | 2.5 |
| 7 | 3.0 | 0 | 0 | 0 | 7 | 3 | 4 | (7.8) |
| 8 | 0.3 | 0 | 0 | 0 | 0 | 0 | 2 | 2.0 |
| 9 | 0.3 | 0 | 0 | 0 | 0 | 0 | 2 | 2.0 |
| 10 | 0.2 | 0 | 0 | 0 | 0 | 0 | 1 | 1.0 |
| 11 | 0.2 | 0 | 0 | 0 | 0 | 0 | 1 | 1.0 |

Fig. 9F

| | Left Score | 2 | 4 | 3 | 5 | 1 | 6 | 7 | Right Score |
|---|---|---|---|---|---|---|---|---|---|
| 0 | 0.5 | 0 | 0 | 0 | 0 | 1 | 2 | 0 | (1.3) |
| 8 | 0.3 | 0 | 0 | 0 | 0 | 0 | 2 | 0 | 1.0 |
| 9 | 0.3 | 0 | 0 | 0 | 0 | 0 | 2 | 0 | 1.0 |
| 10 | 0.2 | 0 | 0 | 0 | 0 | 0 | 1 | 0 | 0.5 |
| 11 | 0.2 | 0 | 0 | 0 | 0 | 0 | 1 | 0 | 0.5 |

Fig. 9G

| | Left Score | 2 | 4 | 3 | 5 | 1 | 6 | 7 | 0 | Right Score |
|---|---|---|---|---|---|---|---|---|---|---|
| 8 | 0.5 | 0 | 0 | 0 | 0 | 0 | 2 | 0 | 1 | 1.3 |
| 9 | 0.7 | 0 | 0 | 0 | 0 | 0 | 2 | 0 | 3 | (3.7) |
| 10 | 0.4 | 0 | 0 | 0 | 0 | 0 | 1 | 0 | 2 | 2.3 |
| 11 | 0.2 | 0 | 0 | 0 | 0 | 0 | 1 | 0 | 0 | 0.3 |

Fig. 9H

| | Left Score | 2 | 4 | 3 | 5 | 1 | 6 | 7 | 0 | 9 | Right Score |
|---|---|---|---|---|---|---|---|---|---|---|---|
| 8 | 0.5 | 0 | 0 | 0 | 0 | 0 | 2 | 0 | 1 | 0 | 0.7 |
| 10 | 0.5 | 0 | 0 | 0 | 0 | 0 | 1 | 0 | 2 | 1 | (2.2) |
| 11 | 0.2 | 0 | 0 | 0 | 0 | 0 | 1 | 0 | 0 | 0 | 0.2 |

Fig. 9I

| | Left Score | 2 | 4 | 3 | 5 | 1 | 6 | 7 | 0 | 9 | 10 | Right Score |
|---|---|---|---|---|---|---|---|---|---|---|---|---|
| 8 | 0.6 | 0 | 0 | 0 | 0 | 0 | 2 | 0 | 1 | 0 | 1 | (1.5) |
| 11 | 0.3 | 0 | 0 | 0 | 0 | 0 | 1 | 0 | 0 | 0 | 1 | 1.2 |

Fig. 9J

| | Left Score | 2 | 4 | 3 | 5 | 1 | 6 | 7 | 0 | 9 | 10 | 8 | Right Score |
|---|---|---|---|---|---|---|---|---|---|---|---|---|---|
| 11 | 0.3 | 0 | 0 | 0 | 0 | 0 | 1 | 0 | 0 | 0 | 1 | 0 | (0.7) |

Fig. 10

| | | | $L_1$ | $A_4$ | $A_3$ | $A_6$ | $R_1$ | | | | |
|---|---|---|---|---|---|---|---|---|---|---|---|
| | | $L_2$ | $A_5$ | $A_1$ | $A_0$ | $A_2$ | $R_2$ | | | | |

52

US 6,522,783 B1

RE-INDEXING FOR EFFICIENT COMPRESSION OF PALETTIZED IMAGES

FIELD OF THE INVENTION

This present invention relates to lossless digital data compression, and more particularly to a method and apparatus for re-indexing digital data to a new symbol mapping as an aid to data compression.

BACKGROUND OF THE INVENTION

Color digital images can be represented in a number of digital formats. FIG. 1 depicts two common formats, a color plane format (planes 24, 26, 28) and a palette-indexed format (table 30 and index image 32). In either format, digital image 20 is represented by an array of pixel values. In a color plane format, each pixel is represented in multiple color planes, for instance, red, green, and blue color planes. In the example of FIG. 1, representative color plane values are shown for a subimage 22 of image 20. Red color plane 24, green color plane 26, and blue color plane 28 represent the intensity of their respective colors, at each pixel position, as a number between 0 and 255. This format allows over sixteen million unique colors to be represented accurately. The downside of this format is that it requires twenty-four bits to represent each pixel in the image.

In many images (particularly computer-generated images and icons) relatively few colors are used. In most other images, a number of intelligently-selected colors much smaller than sixteen million, e.g., 256 colors, may be entirely adequate to represent the image data to a viewer. Such images are ideally suited for a palette-indexed image.

A typical palette-indexed image has two elements: a palette table, which provides for translation between an index value and its associated red, green, and blue intensity values, and an index image, which contains an index value for each pixel in the image. In FIG. 1, palette table 30 contains eight indices, one for each unique combination of red, green, and blue pixel values that is found in subimage 22. For instance, index 0 represents a light gray, index 1 represents white, and index 2 represents a dark brown. Index image 32 contains one index value for each pixel.

The size of a palette-indexed image is the sum of the sizes of the index image and the palette table. For images of any significant size, the palette table typically requires a relatively negligible amount of space, such that the size of the image is dominated by the size of the index image.

A viewable image is created from a palette-indexed image by replacing each index with its palette table entry. Thus, the index "0" for the top left-hand pixel of index image 32 would be used to retrieve the red, green, blue values (192, 192,192) from palette table 30 for use during display of that pixel.

Many applications for palette-indexed images can greatly benefit if the palette-indexed image data can be compressed, e.g., for efficient storage and/or transmittal. Accordingly, several lossless compression schemes are currently employed with palette-indexed images. It has been recognized that for some lossless compression schemes, compression efficiency can vary with palette selection. In other words, by merely "shuffling" the entries in palette table 30 (and re-indexing the index image to conform to the new palette table), different compression values may result for subsequent compression of the index image.

U.S. Pat. No. 5,471,207, issued to Zandi et al., is entitled "Compression of Palettized Images and Binarization for Bitwise Coding of M-ary Alphabets Therefore". Zandi et al. describe a reindexing scheme that uses a context model of the input data to select a particular binarization of the input data to provide good compression with a binary entropy coder. This reindexing scheme accepts a dataset that uses a series of M symbols, $S_0, \ldots, S_{M-1}$, which can be arranged randomly, or in decreasing order of occurrence in the dataset. Symbol $S_0$ is binarized to a first reindex value. Symbol $S_1$ is then binarized to a second reindex value, selected from all unassigned reindex values, that minimizes the bitwise entropy for the reindexed $S_0$ and $S_1$. The process recurses through the remaining symbols $S_i$, each time selecting a reindex value from the unassigned reindex values.

The Zandi et al. approach is limited to systems that use a binary entropy coder, and the performance of their approach is also limited by the particular order in which symbols are considered for re-indexing.

SUMMARY OF THE INVENTION

It is recognized herein that a general approach for reindexing symbols is needed. The embodiments presented herein illustrate such an approach, based on the general observation that many encoders perform better when the data presented to them contains small, rather than large, variations between adjacent data. Thus, for instance, a palettized image may be more easily compressed if symbols that frequently occur adjacent to each other in the index image are assigned symbol values that are close in symbol space.

The embodiments disclosed herein also overcome prior art limitations regarding symbol selection order. For instance, Zandi et al.'s reindexer considers symbols in a fixed order, essentially answering the question, for each symbol in order, "where should this symbol go?" In contrast, the disclosed embodiments consider a limited number of reassignment positions at each iteration, considering many (or all) unassigned symbols for these positions. In essence, these embodiments answer the question "which symbol best belongs in this position?" This approach avoids situations where a critical symbol (from a compressibility standpoint) receives a suboptimal reassignment, merely because more optimal positions were first filled by less critical symbols.

In accordance with one aspect of the invention, a method for reindexing a digital array of symbol values is disclosed. The symbols are drawn from an M-ary alphabet of symbols. An array of cross-counts is calculated, the array comprising individual cross-counts that each indicate the degree of occurrence, within the digital array, of two symbols drawn from the M-ary alphabet appearing in a predefined contextual relationship. A symbol reassignment pool is initialized, and a symbol from the M-ary alphabet is assigned to a seed position in the pool. Unassigned symbols are then considered for assignment to positions adjacent to the symbols already assigned to the pool. To select the appropriate symbol or symbols for assignment, potential functions are calculated for unassigned symbols. A potential function for a particular unassigned symbol and pool position is based on weighted cross-counts between that symbol and those symbols already in the pool. The unassigned symbol with the largest potential function is assigned to the symbol reassignment pool at the position for which that potential function was calculated.

Preferably, each time a symbol is assigned to a position in the symbol reassignment pool, potential functions are recalculated, and then another symbol is assigned to a position in the symbol reassignment pool, this process continuing until all symbols from the M-ary alphabet have been assigned to the symbol reassignment pool.

BRIEF DESCRIPTION OF THE DRAWING

The invention may be best understood by reading the disclosure with reference to the drawing, wherein:

FIG. 6 represents the index values for the pixels of a partial icon image;

FIG. 7 shows a cross-count array generated for the icon image of FIG. 6;

FIG. 8 shows a rearrangement of the cross-count array of FIG. 7 according to an embodiment of the invention;

FIGS. 9A–9J show the steps in a pool selection process using the cross-count array of FIG. 7; and FIG. 10 illustrates a two-dimensional symbol reassignment pool.

DETAILED DESCRIPTION OF THE PREFERRED EMBODIMENTS

The preferred embodiments described below are exemplary, and those of ordinary skill in the art will recognize that they may be tailored in a variety of ways to fit the needs of a specific application. For example, symbols need not be binary symbols, the size of the symbol alphabet need not be a power of two, and the pool need not be one-dimensional. Although the embodiments focus on palette-indexed images, these techniques could be applied equally to reindexing a segmentation mask, or to indexing of a color plane in a full-color image, or to reindexing almost any other type of discrete data.

Figure 1:
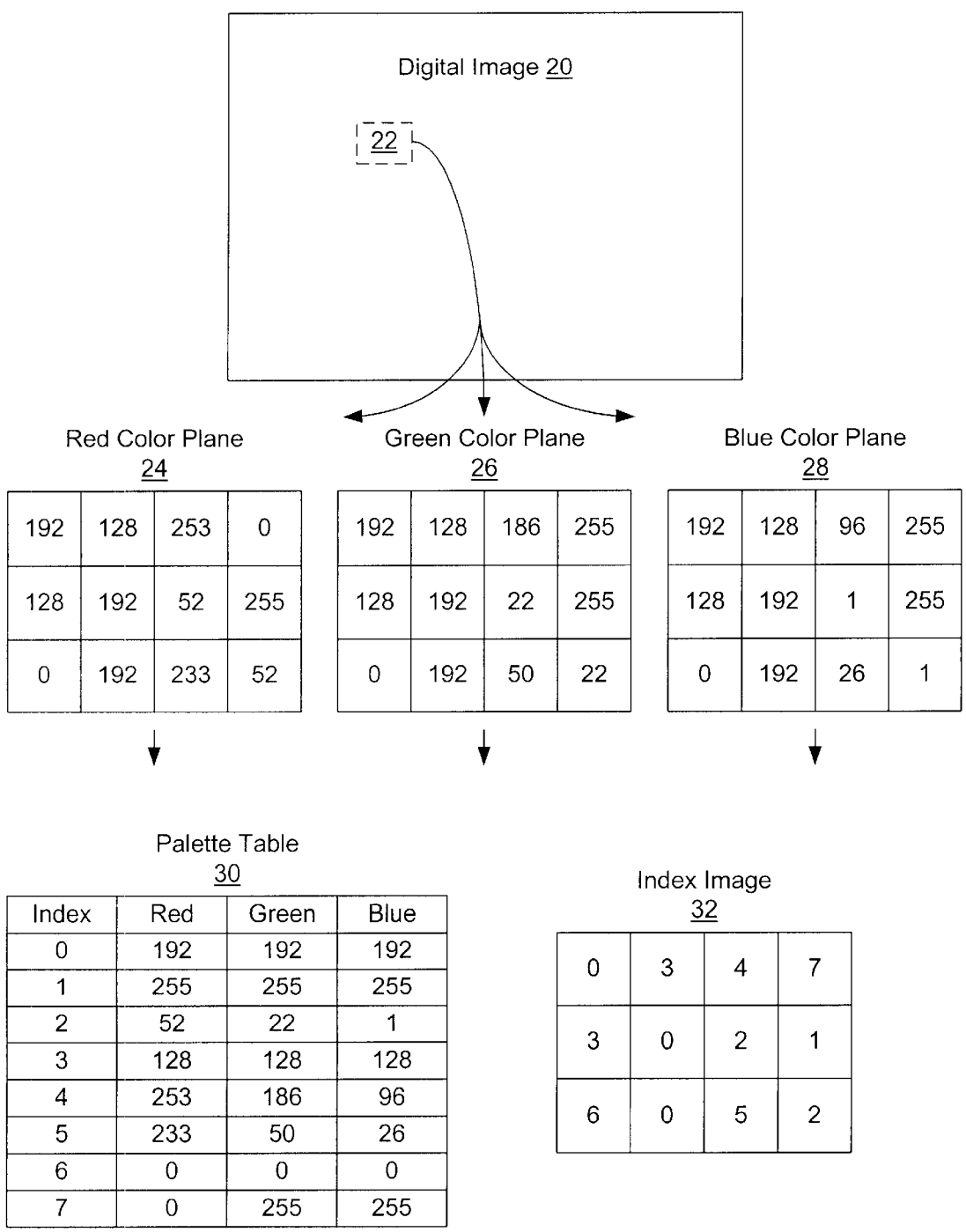
FIG. 1 illustrates two prior art image storage techniques, color plane and palette-indexed.
Figure 2:
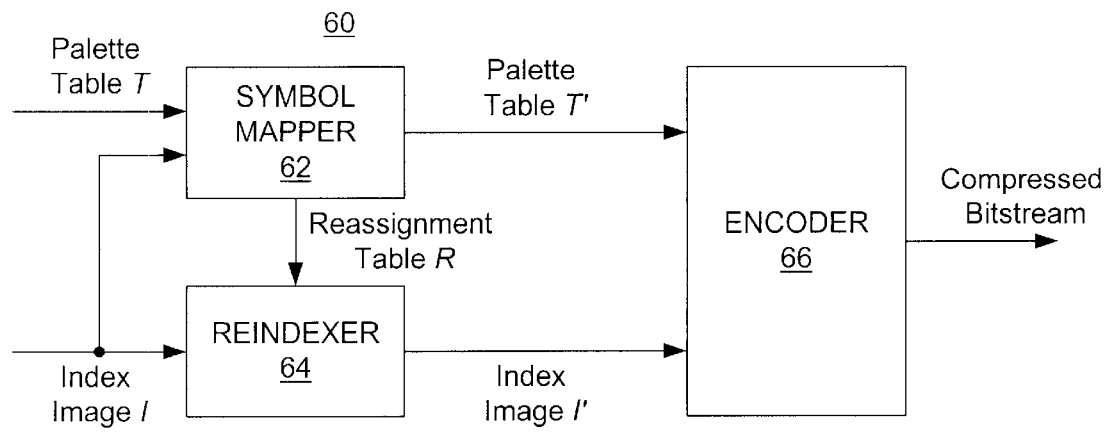
FIG. 2 contains a block diagram for a digital data compressor according to on embodiment of the invention.

FIG. 2 shows a block diagram of a digital data compressor 60. The input to compressor 60 is an image index I and its corresponding palette table T. Symbol mapper 62 remaps the symbols in palette table T according to one of the methods described below, producing a new palette table T'. Symbol mapper 62 also produces a reassignment table R that indicates which symbol in T corresponds to a given symbol in R. Using reassignment table R, reindexer 64 converts the index values in index image I to correspond to new palette table T', thereby producing new index image I'. Palette table T' and index image I' are input to encoder 66, which encodes the table and image, according to known methods, for transmission or storage. Generally, this will involve compressing the index image, and may also involve compressing the palette table.

The desired function of symbol mapper 62 is to produce a symbol mapping that re-indexes image I to provide optimal compression. In general, finding an optimal re-indexing solution by an exhaustive technique is impractical. Given a defined re-indexing criterion, the optimal solution can be obtained by looking at every possible re-indexing map. For example, one potential objective could be to minimize the average difference of the index values of neighboring pixels, i.e., $\Sigma_{u,v} \text{Dif}(u,v)$, where $\text{Dif}(u,v)$ is the sum of the differences of index values between the pixel at location $(u,v)$ and its eight neighboring pixels. Suppose that there are M different colors in a palette-indexed image. An exhaustive search will then require M! re-indexing trials. For example, if M is 16, then the number of trials is 2.09E13. As M increases, it quickly becomes impractical to do such a search. To avoid this computational difficulty, the disclosed embodiments present greedy sub-optimal solutions that are simple to implement.

As mentioned above, one good re-indexing criterion is to minimize the average difference of the index values of neighboring pixels. For palettized images, the relative index values for neighboring pixels generally matter most. In general, the larger the difference between neighboring index values, the more bits it takes to code the transition from one pixel to its neighbor. The disclosed embodiments are designed to re-index the image such that the average difference of the index values of pixels around transitions between differently indexed regions is minimized.

Suppose that in the original index image, the index values $0, 1, \ldots, M-1$ represent color symbols $S_0, S_1, \ldots, S_{M-1}$, respectively. In a first embodiment, a one-to-one symbol reassignment table maps each symbol $S_i$ to a new index value that also takes one integer value in the range $[0, M-1]$. In this first embodiment, one symbol at a time is reassigned in a greedy fashion. Each reassignment is optimized based on the statistics collected from the original index image and previously executed reassignments.

Figure 3:
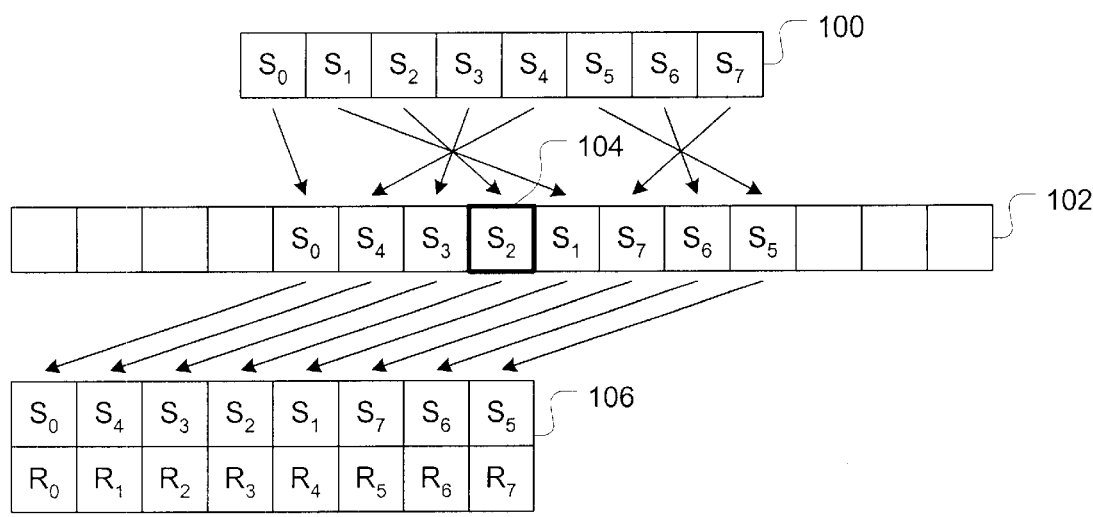
FIG. 3 illustrates an exemplary symbol manipulation according to an embodiment of the invention.

FIG. 3 illustrates one method of arriving at a symbol reassignment table. An alphabet 100 of symbols $S_0, S_1, \ldots, S_7$ is considered for reassignment to positions in a symbol reassignment pool 102, which in this instance is initialized to have fifteen unassigned locations. A first symbol (in this case $S_2$) is selected as a seed symbol according to some criterion, and assigned to a seed position 104 in symbol reassignment pool 102. According to another criterion, another symbol is selected for assignment to either the immediate left or the immediate right of seed position 104. The remaining unassigned symbols are then considered for assignment to either the immediate left or the immediate right of these two symbols in the pool, and one symbol is selected for one of these locations. This process continues until all symbols are assigned to reassignment pool 102. In one practical implementation, the seed position 104 is located in the middle of pool 102, and the size of pool 102 is chosen as 2M−1. This allows enough space for all symbols to be assigned either to the left or to the right of the seed, in the unlikely event that this should occur.

Once all symbols have been assigned to symbol reassignment pool 102, the symbols are mapped in pool-order to symbol reassignment table 106. One simple approach is to shift the pool-assigned symbols down to the low end of pool 102. This approach is illustrated in FIG. 3, where $S_0$ maps to $R_0$, $S_4$ maps to $R_1$, etc. Reassignment table 106 can then be used as a lookup table to re-index the symbols in the original index image.

Figure 4:
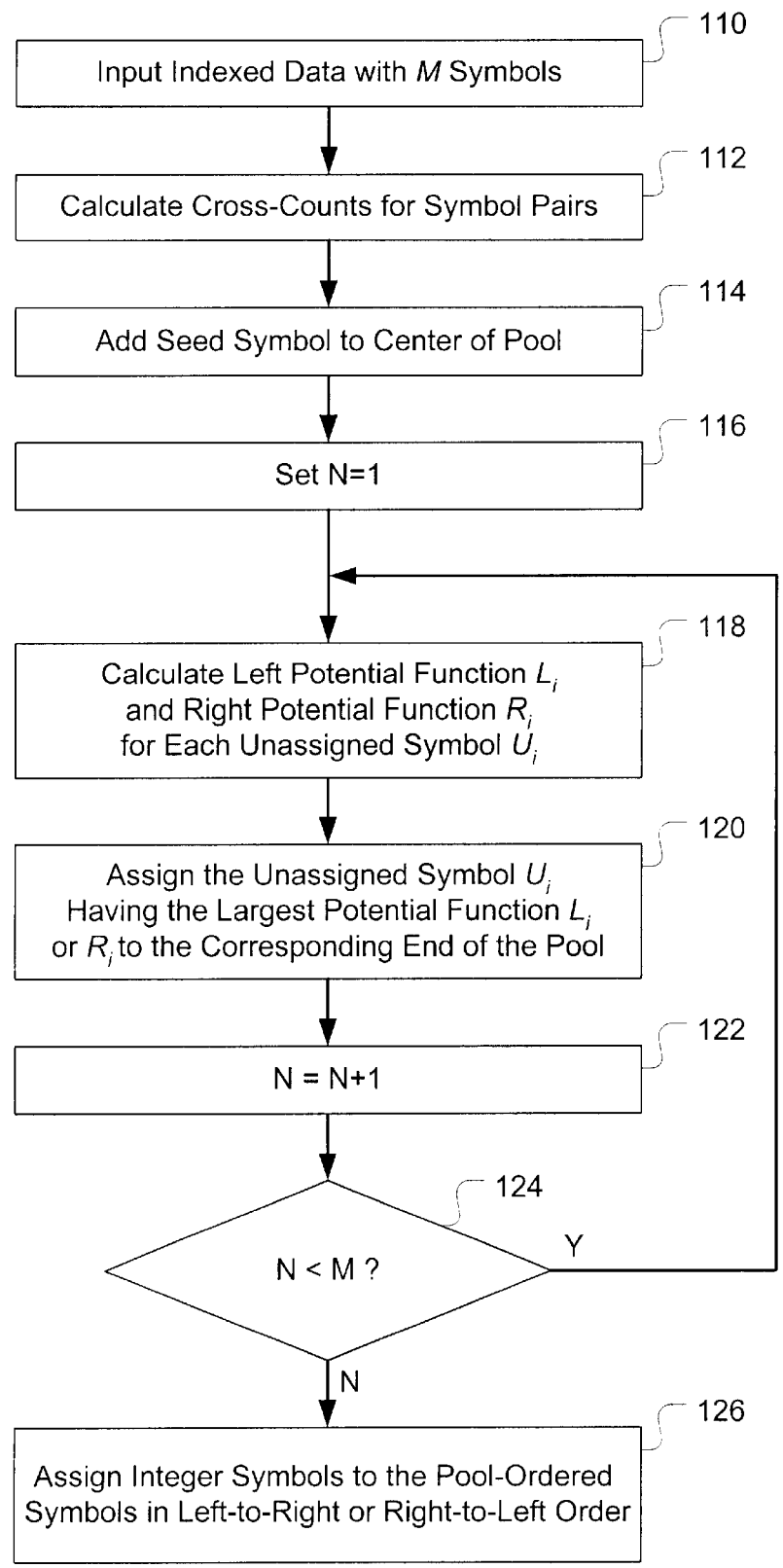
FIG. 4 contains a flowchart illustrating a process of reassigning symbols according to an embodiment of the invention.

The detailed steps of this embodiment are depicted in FIG. 4. At block 110, an original index image with M symbols is input. At block 112, statistics are gathered from the original index image and stored into a cross-count array. Each element of the cross-count array indicates the degree of occurrence of cross-counts $C(S_i, S_j)$ between two different symbols $S_i$ and $S_j$. In this embodiment, the cross-count $C(S_i, S_j)$ is defined as the number of times that a pixel with symbol $S_i$ is spatially adjacent to a pixel with symbol $S_j$ in the original index image. The symbols are characterized at this point as unassigned symbols $U_i=S_i$.

Next, a seed symbol is selected at block 114. The seed is selected by first calculating the cumulative cross-counts $$C_i = \sum_{j=0, j\neq i}^{M-1} C(U_i, U_j)$$

for each unassigned symbol $U_i$. Then, the symbol that has the largest cumulative cross-counts $C_i$ is located, designated as assigned symbol $A_0$, and assigned to a seed position in a pool P. The size of pool P is defined as N, and N is set to 1 at block 116.

Subsequent new pool entries can enter P only at either its left or right end. At block 118, potential functions are calculated for the unassigned symbols. First, the left end position of the pool P is considered. The potential function $L_i=\Sigma_{j=0}^{N-1} w_{(N,j)} C(U_i, A_j)$ is calculated for each unassigned symbol $U_i$, where $w_{(N,j)}$ is a weighting function controlling the impact of cross-count $C(U_i, A_j)$ on the overall potential function $L_i$. In general, $w_{(N,j)}$ will depend on the physical distance between the currently open left end position of the pool P and the position of an assigned symbol $A_j$. The parameter N indicates that the weight $w_{(N,j)}$, in general, may change after each iteration. A similar potential function $R_i$ is calculated for the right end position and each unassigned symbol $U_i$.

At block 120, an unassigned symbol is selected for assignment to the pool based on the potential functions $L_i$ and $R_i$. The selector identifies the unassigned symbol having the largest potential function. When this largest potential function is a left potential function, this symbol is assigned to the left end position. Otherwise, this symbol is assigned to the right end position. The pool size N is incremented at block 122.

At block 124, N is compared to M. If N is less than M, unassigned symbols remain, and the process branches to block 118 and iterates. Once a symbol enters the pool P, it will be indicated as assigned, and will no longer be considered for reassignment. The pool-assignment order reflects whether a left or a right potential function was chosen at each iteration. For example, after three iterations (N=4), the pool could be P={$A_3 A_0 A_1 A_2$}.

After all symbols have been assigned to pool P, a symbol reassignment table is created at block 126. This table assigns symbols $R_i$, e.g., integers 0, 1, . . . , M−1, to the spatially-ordered symbols in the pool P in left-to-right or right-to-left order. A re-indexed index image is generated by replacing the original index value I(x,y) of each pixel in the index image with the new index value $R_i$ that is assigned to that index value.

In the above embodiment, at each iteration a new symbol is assigned immediately to the left or right of the assigned symbols already in the pool. The method is greedy in this sense—no new symbol is allowed to be inserted between any two already assigned symbols. Within this constraint, the goal is to optimize each new assignment. From a compression performance standpoint, a critical issue is the appropriate assignment criterion. The potential function $L_i=\Sigma_{j=0}^{N-1} w_{(N,j)} C(U_i, A_j)$, represents, in some sense, how often pixels marked with the candidate symbol $U_i$ are located adjacent to pixels marked with already assigned symbols $A_j$. The system will favor those symbols that are more frequently located adjacent to the already assigned symbols. Again, this criterion aims to minimize the overall index value difference of neighboring pixels.

The weight $w_{(N,j)}$ will generally depend on the position of an assigned symbol $A_j$ with respect to the pool end position under consideration. One particular choice of the weight $w_{(N,j)}$ may be better for a specific subsequent lossless coding scheme than for others. For example, one reasonable choice of $w_{(N,j)}$ is $1/d_{(N,j)}$, where $d_{(N,j)}$ is the physical distance between the position of $A_j$ and the end position. It will be shown in the following that this is a justifiable, perhaps near optimal choice if LOCO-I/JPEG-LS, the new ISO standard for lossless and near-lossless compression, is to be used to code the index image losslessly.

Figure 5:
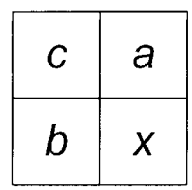
FIG. 5 shows a pixel context that can be used in an embodiment of the invention.

LOCO-I (low complexity lossless compression for images) is a lossless compression algorithm for continuous-tone images, which combines the simplicity of Huffman coding with the compression potential of context models. The algorithm is based on a simple fixed-context model that is tuned for efficient performance in conjunction with a collection of context-conditioned Huffman codes, which is realized with an adaptive symbol-wise, Golomb-Rice code. It follows a traditional predictor-modeler-coder structure. The prediction and modeling in LOCO-I are based on the causal template depicted in FIG. 5, where x denotes the current pixel, and a, b, c are neighboring pixels in the relative positions shown in the figure. The LOCO-I predictor predicts x to be $\chi$:

$$\chi = \begin{cases} \min(a, b) & \text{if } c \geq \max(a, b) \\ \max(a, b) & \text{if } c \leq \min(a, b) \\ a+b-c & \text{otherwise} \end{cases}$$

For palletized images, the prediction error is, in general, the difference between the current pixel index value and one of its neighbors.

A Golomb-Rice code $G_m$ is used in LOCO-I to encode the residue error within each context. Given a positive integer parameter m, the Golomb-Rice code $G_m$ encodes an integer n in two parts: a binary representation of n mod m, and a unary representation of $\lfloor n/m \rfloor$. The parameter m is often chosen to be $2^k$, for the purpose of simple encoding/decoding procedures. In this case, the length of encoding each symbol is $k+1+\lfloor n/2^k \rfloor$. There is an optimal value of k that yields the shortest possible average code length for an input distribution. For an infinite alphabet, it can be shown that a good estimate for the optimal value of k is $k=\log_2 E\{|\epsilon|\}$, where $E\{|\epsilon|\}$ is the expected prediction residue magnitude. It can be seen that the number of bits that it takes to code a residue error has an approximate $\log_2$ relationship with the magnitude of that residue error.

Applying this compression model to the first embodiment above, for a particular end position of the pool P, one of the remaining unassigned symbols $U_i$ will be chosen to fill in this position at each iteration. If symbol $U_i$ is to be assigned to the current pool position, then the total bits needed to code those transition pixels between $U_i$ and each of the already assigned symbols in the pool is on the order of $\Sigma_{j=0}^{N-1} \log_2 d_{(N,j)} C(U_i, A_j)$. If, instead, $U_i$ is not assigned at this iteration, then the total bits needed to code those transition pixels between $U_i$ and each of the already assigned symbols will generally increase. Assuming $U_i$ will be assigned in the subsequent iteration to the immediately adjacent pool position, then the extra amount of bits needed $\Delta B_i$ will be:

$$\Delta B_i = \Sigma_{j=0}^{N-1} \log_2(d_{(N,j)}+1) C(U_i, A_j) - \Sigma_{j=0}^{N-1} \log_2(d_{(N,j)}) C(U_i, A_j)$$

$$= \Sigma_{j=0}^{N-1} \log_2(1+1/d_{(N,j)}) C(U_i, A_j) \approx 1/\ln 2 \, \Sigma_{j=0}^{N-1} 1/d_{(N,j)} C(U_i, A_j)$$

when $d_{(N,j)} \gg 1$.

Therefore, with the weight $w_{(N,j)}$ chosen to be $1/d_{(N,j)}$, the re-indexing procedure tends to, for each iteration, choose, for assignment to the end position, the symbol that will result in the largest saving of coding bits. It should be noted that the above discussion does not intend to provide a rigorous proof. Instead, it aims to offer some insight into why the suggested weighting makes sense. Obviously, an alternative candidate for $w_{(N,j)}$ is $\log_2(1+1/d_{(N,j)})$. Experiments show that these two choices gave similar performance.

A simple example of the method in operation is appropriate at this point. FIG. 6 represents the index values for an index image 34 taken from a small section of a computer desktop icon. Image 34 contains twelve different indices 0–11, which were assigned left-to-right, top-to-bottom as new colors were encountered in a scan of the icon.

FIG. 7 shows a cross-count array 36 for index image 34. The twelve indices appear across the top and down the left side of the array. Index image 34 is scanned, and the array position corresponding to two indices is incremented each time the two indices appear horizontally adjacent each other. The blank locations in array 36 indicate that the two symbols corresponding to that array element never appeared next to each other in the defined context. This indicates that compression performance would probably not be affected by placing those two symbols far apart in symbol space. Although not calculated for this example, vertically-adjacent, diagonally-adjacent, or other pixel relationships could also be represented in cross-count array 36.

An alternate way of visualizing the reordering problem at a high level is: how can the symbol order be rearranged to move the non-zero cross-count values of array 36 as close to the diagonal of the array as possible, placing the largest non-zero values closest to the diagonal? Rearranged cross-count array 38 of FIG. 8 illustrates one solution obtained with an embodiment of the invention. In cross-count array 36, the average symbol distance of a horizontal pixel transition is 3.04, with a maximum symbol distance of 10. In re-indexed cross-count array 38, the average symbol distance has been decreased to 1.71, with a maximum symbol distance of 5.

FIGS. 9A through 9J illustrate, step-by-step, how each symbol appearing in index image 34 was assigned to a pool 50 in order to produce (for illustration purposes) the rearranged cross-count array 38 of FIG. 7. As first and second (unillustrated) steps, the following happens: The cumulative cross-counts for each symbol are tallied, resulting in symbol 5 being selected as a seed symbol. A first iteration of the selection procedure selects symbol 1 for assignment adjacent symbol 5, as symbol 1 has the highest number of cross-counts with symbol 5. Symbol 1 is arbitrarily assigned to the right of symbol 5 in pool 50.

FIG. 9A illustrates the second iteration of the procedure, after symbols 1 and 5 are assigned to pool 50. The values under the entries of pool 50 illustrate the cross-counts between each assigned and each unassigned symbol. From these, distance-weighted left and right scores are calculated for each unassigned symbol. Because the weighting function is inversely proportional to pool distance, the scoring is relatively simple for this iteration—a left score for an unassigned symbol is its cross-count with symbol 5, added to half its cross-count for symbol 1. Using this function, the right score for unassigned symbol 6 is the largest score overall, and thus symbol 6 is assigned to the right end of pool 50, as shown in FIG. 9B.

The process continues in similar fashion until the position of the final unassigned symbol is determined in FIG. 9J.

Note that at each iteration, the left and right scores (potential functions) become more complex, but the number of unassigned symbols decreases. Computation complexity per iteration reaches a maximum halfway through the reassignment procedure. Several methods are available to reduce the computational complexity, as will be detailed later.

An extension of the method described above is to re-index K symbols at one time. At each iteration, given the already re-indexed symbols in the pool, the K unassigned symbols that maximize some appropriate potential function will be chosen for assignment to the right and/or left hand sides of the pool. This extension is illustrated below for the case K=2.

In this embodiment, a seed symbol can be chosen as in the first embodiment. Now suppose that a new ordered pair ($U_i$, $U_k$) ($i \neq k$) of unassigned symbols is to be assigned to the left and/or right hand sides of the current pool P. There are three possible scenarios as illustrated here: Case 1: $\{P\}U_i U_k$; Case 2: $U_i U_k \{P\}$; Case 3: $U_i\{P\}U_k$. The potential functions for these three cases are:

$$D^1_{i,k} = \Sigma_{j=0}^{N-1} w_{R(N,j)} C(U_i, A_j) + \Sigma_{j=0}^{N} w_{R(N+1,j)} C(U_k, A_j)$$

$$D^2_{i,k} = \Sigma_{j=0}^{N-1} w_{L(N,j)} C(U_k, A_j) + \Sigma_{j=0}^{N} w_{L(N+1,j)} C(U_i, A_j)$$

$$D^3_{i,k} = \Sigma_{j=0}^{N-1} w_{L(N,j)} C(U_i, A_j) + \Sigma_{j=0}^{N} w_{R(N+1,j)} C(U_k, A_j)$$

where $w_{R(N,j)}$ and $w_{L(N,j)}$ represent the weights corresponding to the cases where the symbol is assigned to the right hand or the left hand sides of the pool, respectively. Note that for the second half of each potential function, $A_N$ is assumed to be either $U_i$ or $U_k$, whichever was used to compute the first half of that potential function.

For each candidate ordered pair ($U_i$, $U_k$), the case with the largest potential function value is chosen. The corresponding largest potential function value is recorded as the potential value for that pair. Then the ordered pair that has the largest potential value is selected for reassignment at this iteration, and is assigned according to the best scenario among the three cases.

In an actual implementation, there are several ways to reduce the computational cost of the disclosed embodiments by storing some intermediate results. For example, for a fixed i, the first half of potential function $D^1$ is the same for different k values. This intermediate result can be calculated once for each i and stored for later usage. It can also be used for similar terms calculated for the ordered pair ($U_k$, $U_i$), and will differ by only one added element for the second half of $D^3$.

Some intermediate results generated in previous iterations can also be stored and used in later iterations. For example, if for the current iteration a pair of symbols are chosen to join the pool from the right hand side (Case 1), then some intermediate results obtained for Case 2 in the current iteration can be reused for the next iteration, since the pool configuration does not change except that there are two more symbols at the right hand side of the pool. The same idea is also applicable to the basic scheme where only one symbol is assigned at one time.

Computational cost can also be reduced by use of an exponentially-decreasing weighting function, e.g., $w_{(N,j)} = \alpha^{d_{(N,j)}}$, that approximates a desired weighting function. This allows updates to be made to each potential function by updating for only the last element added to the pool. For instance, if $L_{i,N}$ is the current left potential function for unassigned symbol $U_i$ when N symbols are in the pool, the following holds:

$$L_{i,N} = \sum_{j=0}^{N-1} \alpha^{d(N,j)} C(U_i, A_j)$$

$$L_{i,N+1} = \sum_{j=0}^{N-1} \alpha^{d(N,j)+1} C(U_i, A_j) + \alpha C(U_i, A_N)$$

$$= \alpha(L_{i,N} + C(U_i, A_N))$$

Even when the weighting function cannot be expressed exponentially, it is usually possible to avoid most of the exact weighting function calculations at each iteration. This can be accomplished by use of a simple but approximate potential function that is strictly greater than or equal to the actual potential weighting function. Generally, one candidate function is $$\lceil L_{i,N} \rceil = \beta_N \lceil L_{i,N-1} \rceil + C(U_i, A_{N-1}),$$

where $$\beta_N = \max_{j=0}^{N-2} \left( \frac{w_{(N,j)}}{w_{(N-1,j)}} \right).$$

For a weighting function that is based inversely on distance, it can be verified that $$\beta_N = \frac{N-1}{N}.$$

The approximate potential function can be used as follows. Suppose that the last iteration resulted in the assignment of a symbol to the left side of the pool. The right potential functions for the remaining unassigned symbols can be updated by adding a single cross-count to each for the newly assigned symbol, as has been previously described. The left potential functions are updated using the approximate potential weighting function above. During this updating process, the largest potential function found, actual or approximate, is noted. If the largest is an actual potential function, its symbol can be assigned immediately to the appropriate pool position with no further calculation. If the largest is approximate, the corresponding actual potential weighting function is calculated for that symbol. This actual function is compared to the other potential functions—actual or approximate—and if one is found that is greater, its corresponding actual potential weighting function is calculated if required. If the actual function for this symbol is still greater than the current maximum, it becomes the new comparison for the remainder of the search.

It can be appreciated that with this process, computation of actual potential functions can be avoided for many symbols that are not in serious contention at that time for a pool position. Some symbols may go through many iterations without requiring computation of an actual potential function. And yet the symbol with the largest actual potential function will still be located during each iteration.

Figure 10:
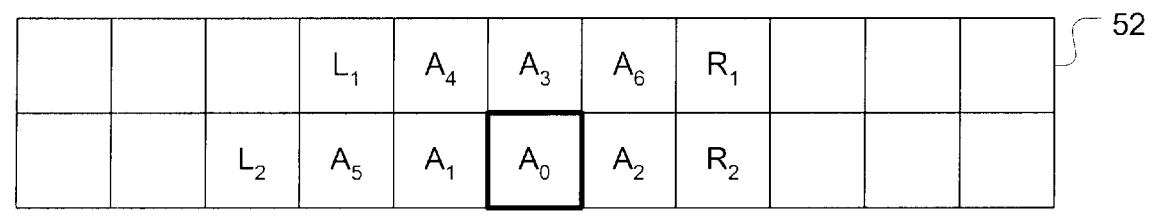

It is not necessary that the pool be one-dimensional. FIG. 10 shows a pool 52 with dimensions 2×N, where N=M+1. This 2D pool allows symbols to have greater adjacency in symbol space. The increased adjacency allows more symbols to be packed adjacent, and is thus useful when symbols occur in many different contexts in an image. The disadvantage of this approach is that it requires additional complexity. For instance, pool 52 requires twice as many potential functions, since they must be calculated for positions $L_1$, $L_2$, $R_1$, and $R_2$. Pool 52 may also require that one bit plane of the index image, e.g., the most significant bit plane, be coded separately from the other bit planes in order to achieve best results.

The re-indexing method of the first embodiment was tested on a set of icon-like graphics images. Each image has a limited number of colors. Each image was first palettized, resulting in a color palette table and an index image. The initial indices were generated using a luminance-intensity-based approach. In other words, the colors were sorted according to the intensity value of the luminance component. Then, the indices 0, . . . , M–1 were assigned to the colors in descending order of luminance intensity. This is a reasonable indexing scheme, because it assigns close index values to colors with close luminance intensity values.

The first embodiment re-indexing method was then applied to the initial index image. The context used to create the cross-count array was generated by adding one count for two horizontally-adjacent symbols, and one count for two vertically-adjacent symbols. The weighting function $1/d_{(N,Lj)}$ was used for the results reported below.

The re-indexed index images were then subjected to lossless compression using two different compression techniques, JPEG-LS, (see FCD 14495, Lossless and near-lossless coding of continuous tone still images, ISO/IEC JTC1/SC29 WG1 (JPEG/JBIG)), and JPEG-2000 Verification Model 3A, (see D. Taubman, Report on core experiment CodEff22: (EBCOT: Embedded Block Coding with Optimized Truncation), ISO/IEC JTC1/SC29/WG1 N1020R, Oct. 21, 1998.) These two cases are referred to as palette-based JPEG-LS and palette-based JPEG 2000, respectively.

Table 1 shows the test results. The results for palette-based JPEG-2000 reported in Table 1 are the best results among those obtained using the set of wavelet filters provided in JPEG-2000 VM3A software. The number of coding bits for palette-based JPEG-LS and palette-based JPEG-2000 is written as a sum of two parts: the first one is the bits for coding the index image; the second one is the size of the color palette table, which is included uncompressed in the compressed bitstream. The results in Table 1, however, suggest that it may also be advantageous to compress the color palette table in some cases. It is seen from Table 1 that, for palette-based JPEG-LS and palette-based JPEG2000, the proposed re-indexing scheme, on the average, reduces the bit rate by 19.6% and 31.8% respectively, when compared to the intensity-based indexing scheme.

The palette-based JPEG2000 appears to be more sensitive to the indexing scheme. The palette-based JPEG-LS generally outperforms the palette-based JPEG2000. Note that for the palette-based JPEG2000 tested here, the mean removed before wavelet transform is 128 (the default value, good for natural images). Better performance is expected if the mean removed is the actual mean of the index image, since this will generally make the lowest band of the wavelet coefficients more symmetric with respect to zero. Palette-based JPEG-LS also outperforms GIF, with an average of about 25% bit rate savings. Note that the performance of GIF does not depend on the indexing scheme used.

TABLE 1

| | Losslessly compressed bitstream size (bytes) | | | | | | |
|---|---|---|---|---|---|---|---|
| | Palette-based JPEG-LS | | | Palette-based JPEG-2000 | | | |
| Graphics images | Intensity-based | Re-indexing | Saved bits (%) | Intensity-based | Re-indexing | Saved bits (%) | GIF |
| Af29 | 5336 ± 726 | 4461 ± 726 | 14.5 | 6699 ± 726 | 5181 ± 726 | 20.4 | 5600 |
| Andrene | 2290 ± 79 | 1552 ± 79 | 31.1 | 3160 ± 79 | 2117 ± 79 | 32.2 | 2034 |
| Bod7 | 4959 ± 477 | 4414 ± 477 | 10.0 | 6541 ± 477 | 5154 ± 477 | 19.8 | 5642 |
| Party8 | 7233 ± 113 | 5942 ± 113 | 17.6 | 12482 ± 113 | 6951 ± 113 | 43.9 | 17650 |
| Pizza | 11138 ± 74 | 8269 ± 74 | 25.6 | 16329 ± 74 | 8965 ± 74 | 44.9 | 10142 |
| Rob | 3313 ± 52 | 2416 ± 52 | 26.7 | 4828 ± 52 | 2894 ± 52 | 39.6 | 3595 |
| Sam | 1813 ± 76 | 1585 ± 76 | 12.1 | 2637 ± 76 | 2051 + 76 | 21.6 | 2071 |

The present invention can be applied to compression of other generalized images (1-dimensional, 2D, or more than 2D) that can be characterized as consisting of one index map and one table that specifies what properties each index corresponds to. An example is compression of the VQ (Vector quantization) index resulting from a vector quantization operation, where each of the VQ indices corresponds to a vector in a codebook. The invention can also be generalized for applications other than compression. In general, for any optimization application that involves a set of indices and a table that specifies what properties each index corresponds to, where it is possible to define an appropriate measure that depends on the index assignment, the disclosed invention is applicable. In this case, the potential function may be different. The basic idea, however, remains the same.

Many of the details of the preferred embodiments are just that, and many other design choices are available. For example, it is the difference between two neighboring pixel index values, rather than the absolute index values, that usually matters for compression efficiency. Therefore, the index value of the seed symbol $A_0$ is merely as a reference value. Other methods of choosing a seed symbol may also be appropriate. For example, one of the pair of symbols which have the largest cross-count $C(S_i, S_j)$ can be chosen as the starting symbol, and the other symbol of the pair assigned adjacent it in the pool.

One of ordinary skill in the art will recognize that the concepts taught herein can be tailored to a particular application in many other advantageous ways. Such minor modifications are encompassed within the invention, and are intended to fall within the scope of the claims.

What is claimed is:

1. A method for reindexing a digital array of symbol values, each symbol value drawn from an M-ary alphabet of symbols, the method comprising:
    calculating an array of cross-counts, the array comprising individual cross-counts that each indicate the degree of occurrence, within the digital array, of two symbols drawn from the M-ary alphabet appearing in a pre-defined contextual relationship;
    initializing a symbol reassignment pool;
    assigning a symbol from the M-ary alphabet to a seed position in the symbol reassignment pool;
    calculating at least one potential function for each of a set of candidate symbols from the M-ary alphabet that are as yet unassigned to a position in the symbol reassignment pool, each potential function for a particular unassigned symbol respectively assessing, based on pool-distance-weighted cross-counts between that symbol and those symbols already assigned to the pool, the impact of assigning that unassigned symbol to a selected position adjacent to those symbols already assigned to the pool;
    assigning the unassigned symbol with the largest potential function to the symbol reassignment pool at the position selected for calculation of that largest potential function.

2. The method of claim 1, further comprising generating a symbol reassignment table that assigns adjacent symbols in the symbol reassignment pool to adjacent symbols in a second alphabet.

3. The method of claim 2, wherein the digital array comprises a palette-indexed image, the method further comprising re-indexing the image by replacing each symbol in the image with its corresponding symbol in the second alphabet.

4. The method of claim 1, wherein the symbol assigned to the seed position is the symbol having the largest cumulative number of cross-counts with other symbols.

5. The method of claim 1, wherein the symbol assigned to the seed position is one of the two symbols having the largest number of cross-counts between them, the method further comprising assigning the other of the two symbols to a position adjacent the seed position.

6. The method of claim 1, wherein calculating an array of cross-counts comprises initializing the cross-count array, stepping through the digital array, and each time two symbols appear within the digital array in the predefined contextual relationship, incrementing a cross-count in the cross-count array that corresponds to those two symbols in that predefined contextual relationship.

7. The method of claim 6, wherein the predefined contextual relationship comprises a relationship of symbol adjacency in the digital array.

8. The method of claim 1, further comprising iterating, for the purpose of assigning further symbols to the symbol reassignment pool, the steps of calculating at least one potential function and assigning the unassigned symbol with the largest potential function.

9. The method of claim 8, wherein the iterating step continues until all symbols from the M-ary alphabet have been assigned to the symbol reassignment pool.

10. The method of claim 9, further comprising generating a symbol reassignment table that assigns adjacent symbols in the symbol reassignment pool to consecutive symbols in a second alphabet.

11. The method of claim 1, wherein the at least one potential function for each of a set of candidate symbols comprises a left potential function $L_i$, and wherein:

$C(U_i, A_j)$ represents the cross-count for the alphabet symbols $U_i$ and $A_j$, wherein $U_i$ represents an unassigned symbol and $A_j$ represents an assigned symbol;

N represents the number of symbols presently assigned to the symbol reassignment pool;

$w_{L(N,j)}$ represents a pool-distance-weighting function based on the number of pool positions from the current left end of the pool to the position of the assigned symbol $A_j$; and the left potential function for an unassigned symbol $U_i$ is calculated as $$L_i = \sum_{j=0}^{N-1} w_{L(N,j)} C(U_i, A_j).$$

12. The method of claim 11, wherein:

$d_{L(N,j)}$ is the number of pool positions from the current left end of the pool to the assigned symbol $A_j$; and the pool-distance-weighting function $w_{L(N,j)}$ is inversely proportional to $d_{L(N,j)}$.

13. The method of claim 11, wherein:

$d_{L(N,j)}$ is the number of pool positions from the current left end of the pool to the assigned symbol $A_j$; and the pool-distance-weighting function $w_{L(N,j)}$ is proportional to $\log_2(1+1/d_{L(N,j)})$.

14. The method of claim 11, wherein:

$d_{L(N,j)}$ is the number of pool positions from the current left end of the pool to the assigned symbol $A_j$; and the pool-distance-weighting function $w_{L(N,j)}$ is proportional to $\alpha^{d_{L(N,j)}}$, where $0<\alpha<1$.

15. The method of claim 11, wherein the at least one potential function for each of a set of candidate symbols further comprises a right potential function $R_i$, and wherein:

$w_{R(N,j)}$ represents a pool-distance-weighting function based on the number of pool positions from the current right end of the pool to the position of the assigned symbol $A_j$; and the right potential function for an unassigned symbol $U_i$ is calculated as $$R_i = \sum_{j=0}^{N-1} w_{R(N,j)} C(U_i, A_j).$$

16. The method of claim 15, wherein:

$d_{R(N,j)}$ is the number of pool positions from the current right end of the pool to the assigned symbol $A_j$; and the pool-distance-weighting function $w_{R(N,j)}$ is inversely proportional to $d_{R(N,j)}$.

17. The method of claim 15, wherein:

$d_{R(N,j)}$ is the number of pool positions from the current right end of the pool to the assigned symbol $A_j$; and the pool-distance-weighting function $w_{R(N,j)}$ is proportional to $\log_2(1+1/d_{R(N,j)})$.

18. The method of claim 1, wherein calculating at least one potential function comprises calculating at least one potential function for a pair of unassigned symbols, and wherein assigning the unassigned symbol with the largest potential function further comprises assigning the other symbol of the pair generating the largest potential function to the position selected for the other symbol for calculation of that largest potential function.

19. The method of claim 18, wherein calculating at least one potential function for a pair of unassigned symbols comprises calculating potential functions for at least six possible symbol assignments, wherein $U_i$ and $U_j$ are the unassigned symbols of the pair, P represents the symbols already in the pool, and the six possible symbol arrangements are: $U_iU_jP$, $PU_iU_j$, $U_iPU_j$, $U_jU_iP$, $PU_jU_i$, and $U_jPU_i$.

20. The method of claim 1, wherein the symbol reassignment pool is a vector, the size of the symbol reassignment pool is approximately twice M, and wherein the seed position of the pool is approximately in the middle of the pool, the method further comprising, after assigning the symbols of the M-ary alphabet to the symbol reassignment pool, assigning sequential reassignment symbols to the pool-ordered symbols, and mapping the symbol values in the digital array from the original M-ary alphabet to the corresponding reassignment symbols.

21. The method of claim 1, wherein the symbol reassignment pool is a two-dimensional array.

22. An article of manufacture comprising a computer-readable medium, the computer-readable medium containing a program that configures a processor to execute the method of claim 2.

23. A digital data compressor comprising:

a symbol mapper to accept a digital array of symbol values drawn from an M-ary alphabet and generate, according to the method of claim 2, a symbol reassignment table;

an array reindexer to reindex the digital array to a new alphabet of symbol values according to the symbol reassignment table; and an encoder to compress the reindexed digital array.

* * * * *

UNITED STATES PATENT AND TRADEMARK OFFICE
CERTIFICATE OF CORRECTION

PATENT NO. : 6,522,783 B1
DATED : February 18, 2003
INVENTOR(S) : Zeng et al.

It is certified that error appears in the above-identified patent and that said Letters Patent is hereby corrected as shown below:

Column 3,
Line 11, "to on embodiment" should read -- to one embodiment --.

Column 6,
Line 65, "$\approx 1/\ln 2 \Sigma_{j=0}^{N-1} 1/d_{(N,j)} C(U_i,A_j)$" should read -- $\approx 1/\ln 2 \ \Sigma_{j=0}^{N-1} 1/d_{(N,j)} \ C(U_i,A_j)$ --.

Column 11,
Lines 1-17,

| Intensity-based | Re-indexing | Saved bits (%) | Intensity-based | Re-indexing |
|---|---|---|---|---|
| 5336 ± 726 | 4461 ± 726 | 14.5 | 6699 ± 726 | 5181 ± 726 |
| 2290 ± 79 | 1552 ± 79 | 31.1 | 3160 ± 79 | 2117 ± 79 |
| 4959 ± 477 | 4414 ± 477 | 10.0 | 6541 ± 477 | 5154 ± 477 |
| 7233 ± 113 | 5942 ± 113 | 17.6 | 12482 ± 113 | 6951 ± 113 |
| 11138 ± 74 | 8269 ± 74 | 25.6 | 16329 ± 74 | 8965 ± 74 |
| 3313 ± 52 | 2416 ± 52 | 26.7 | 828 ± 52 | 2894 ± 52 |
| 1813 ± 76 | 1585 ± 76 | 12.1 | 637 ± 76 | 2051 ± 76" | should read

| --Intensity-based | Re-indexing | Saved bits (%) | Intensity-based | Re-indexing |
|---|---|---|---|---|
| 5336 + 726 | 4461 + 726 | 14.5 | 6699 + 726 | 5181 + 726 |
| 2290 + 79 | 1552 + 79 | 31.1 | 3160 + 79 | 2117 + 79 |
| 4959 + 477 | 4414 + 477 | 10.0 | 6541 + 477 | 5154 + 477 |
| 7233 + 113 | 5942 + 113 | 17.6 | 12482 + 113 | 6951 + 113 |
| 11138 + 74 | 8269 + 74 | 25.6 | 16329 + 74 | 8965 + 74 |
| 313 + 52 | 2416 + 52 | 26.7 | 4828 + 52 | 2894 + 52 |
| 1813 + 76 | 1585 + 76 | 12.1 | 2637 + 76 | 2051 + 76-- |

Signed and Sealed this

Tenth Day of August, 2004

JON W. DUDAS
*Acting Director of the United States Patent and Trademark Office*